5 Sheets—Sheet 1.

E. E. CARTER.

Assignor to J. S. SCULLY.

MINING MACHINE.

No. 11,058. Reissued Feb. 4, 1890.

WITNESSES:

Damon S. Wolcott

F. E. Gaither

INVENTOR,

Edwin E. Carter by George H. Christ

Att'y.

5 Sheets—Sheet 2.

E. E. CARTER.

Assignor to J. S. SCULLY.

MINING MACHINE.

No. 11,058. Reissued Feb. 4, 1890.

WITNESSES:

Darwin S. Wolcott

F. E. Gaither

INVENTOR:

Edwin E. Carter,

George H. Christy

Att'y.

E. E. CARTER.

Assignor to J. S. SCULLY.

MINING MACHINE.

No. 11,058. Reissued Feb. 4, 1890.

WITNESSES:

Darwin S. Wolcott

F. E. Gaither

INVENTOR,

Edwin E. Carter, by George H. Christy

Att'y.

5 Sheets—Sheet 4.

E. E. CARTER.

Assignor to J. S. SCULLY.

MINING MACHINE.

No. 11,058. Reissued Feb. 4, 1890.

WITNESSES:

Drumm & Wolcott

F. E. Gaither

INVENTOR,

Edwin E. Carter by George H. Christy

Att'y.

E. E. CARTER.

Assignor to J. S. SCULLY.

MINING MACHINE.

No. 11,058. Reissued Feb. 4, 1890.

WITNESSES:

Damyns Wolcott

F. E. Gaither

INVENTOR

Edwin E. Carter.

by George H. Christy

Att'y.

UNITED STATES PATENT OFFICE.

EDWIN E. CARTER, OF PITTSBURG, PENNSYLVANIA, ASSIGNOR TO JOHN S. SCULLY, OF SAME PLACE.

MINING-MACHINE.

SPECIFICATION forming part of Reissued Letters Patent No. 11,058, dated February 4, 1890.

Original No. 398,313, dated February 19, 1889. Application for reissue filed April 6, 1889. Serial No. 306,260.

*To all whom it may concern:*

Be it known that I, EDWIN E. CARTER, a citizen of the United States, residing at Pittsburg, in the county of Allegheny and State of Pennsylvania, have invented or discovered certain new and useful Improvements in Mining-Machines, of which improvements the following is a specification.

The invention described herein relates to certain improvements in that class or kind of mining-machines wherein are employed a series of rotating cutters operating in substantially the same horizontal plane, said cutters being movable back and forth through their driving mechanism for the purpose of undercutting the coal.

The invention has for its object such a construction of machine of the class indicated as will permit of the formation of a low narrow under-cut and of the arrangement of the steadying or guide bar for the cutters in close proximity to the coal-breast, the clearing or cleaning mechanism being so constructed as to follow the cutters in their inward movement, and that its effectiveness in clearing the under-cut of dust, &c., increases in proportion to the depth of penetration of the cutters; and, further, the invention has for its object such additional improvements in the construction and arrangement of the operating mechanism as will render the same more effective and economical in operation.

In general terms the invention consists in the construction and combination of mechanical devices or elements, all as more fully hereinafter described and claimed.

Figure 1:
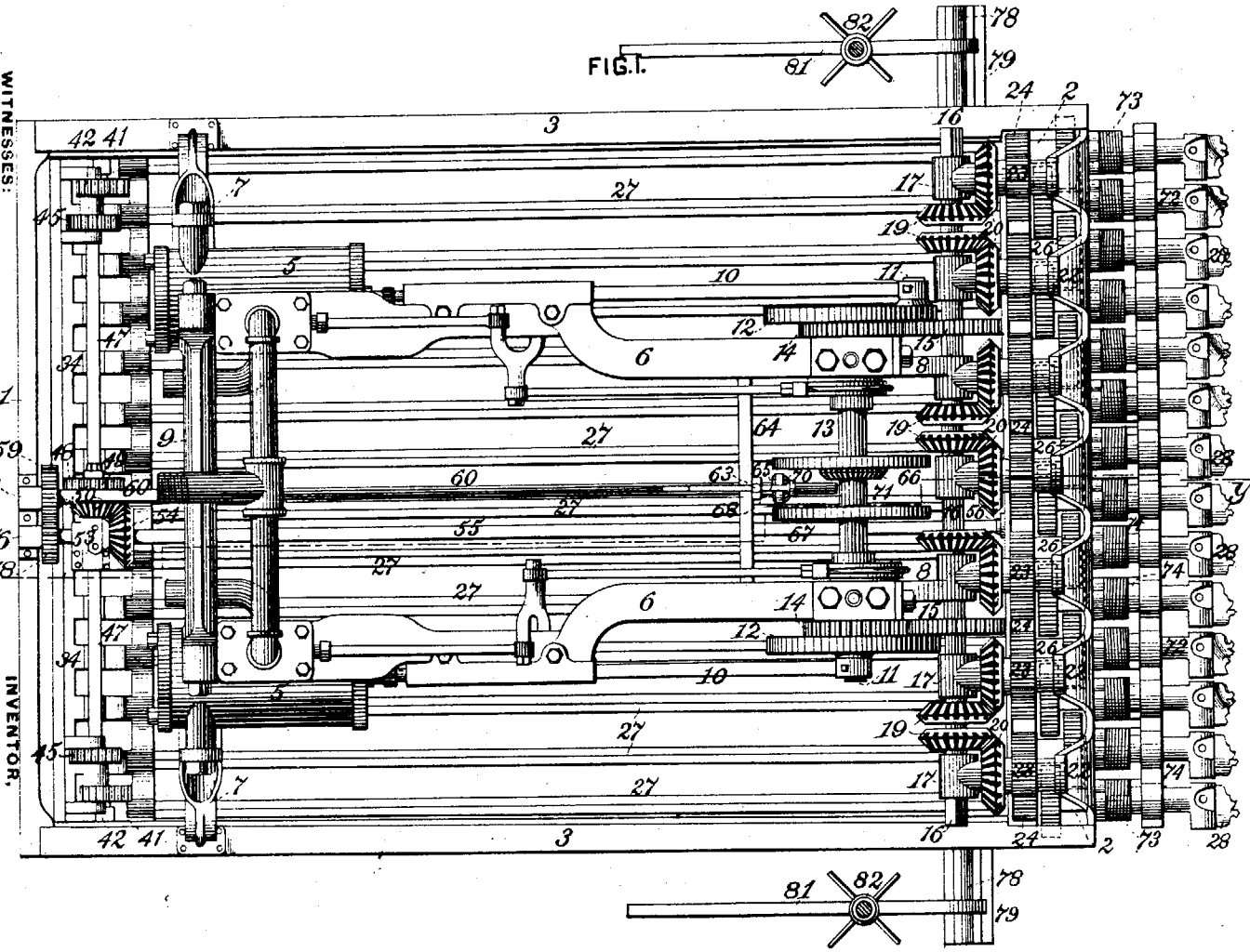
Figure 2:
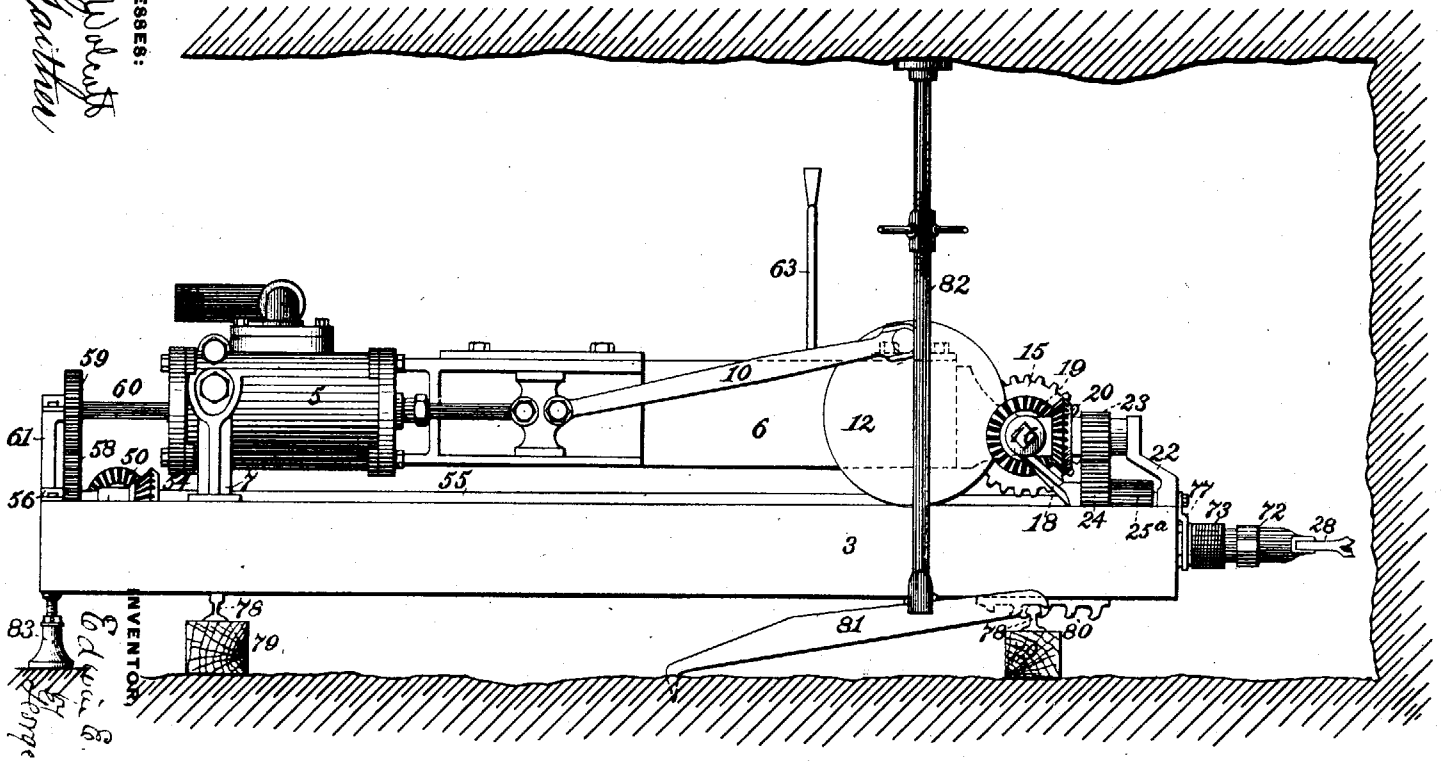
Figure 3:
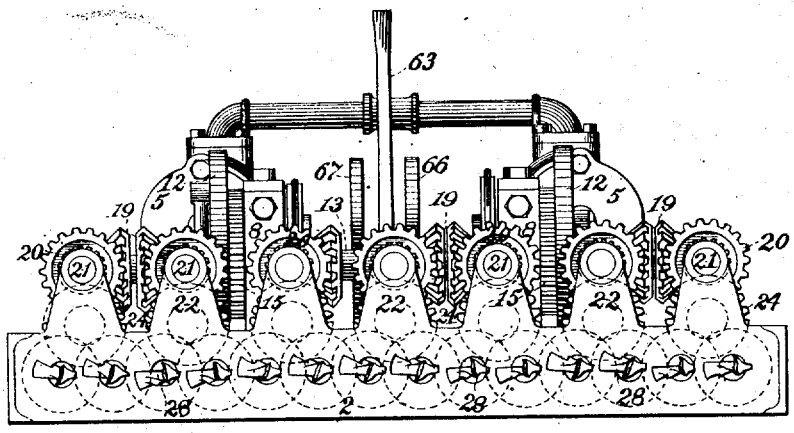
Figure 4:
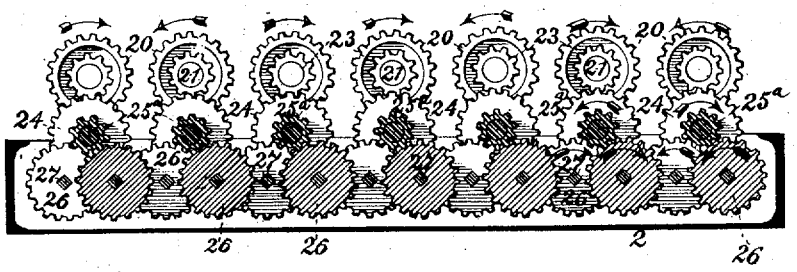
Figure 6:
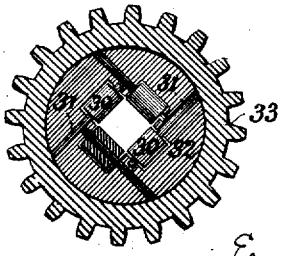
Figure 5:
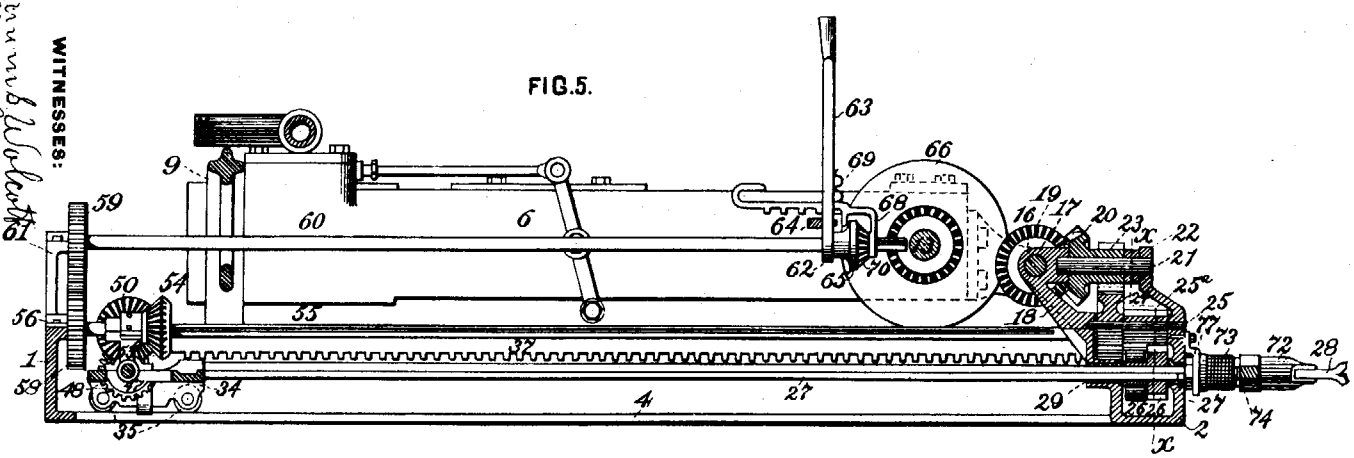
Figure 9:
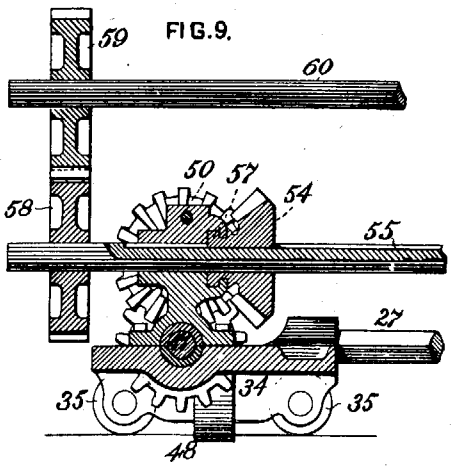
Figure 8:
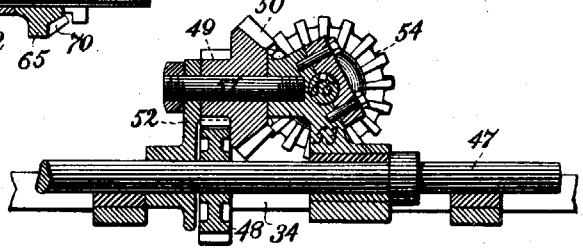
Figure 7:
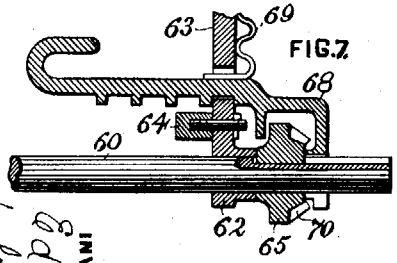
Figure 10:
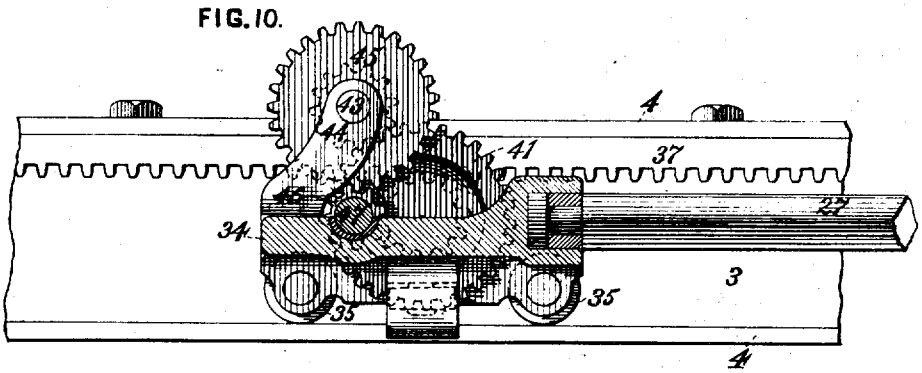
Figure 11:
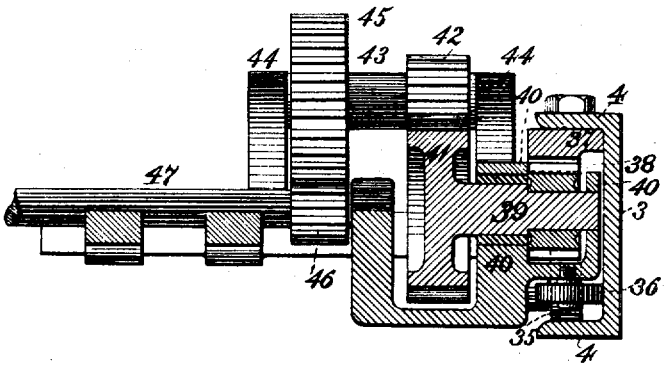
Figure 12:
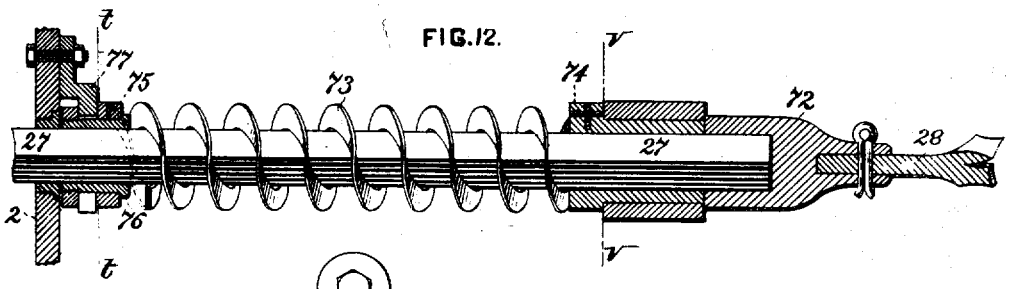
Figure 13:
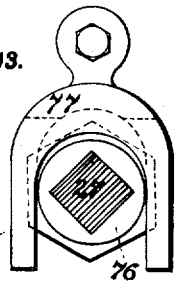
Figure 14:
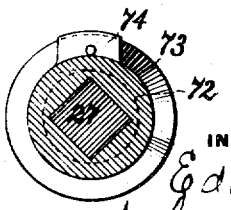

In the accompanying drawings, forming a part of this specification, Figure 1 is a plan view of my improved mining-machine. Fig. 2 is a view in side elevation of the same, showing the machine in operative position in a mine. Fig. 3 is a view showing the front end of the machine in elevation. Fig. 4 is a view partly in section and partly in elevation, the section being taken on the line *x x*, Fig. 5. Fig. 5 is a longitudinal section on the line *y y*, Fig. 1. Fig. 6 is a sectional view of one form of the spindle-driving gears. Fig. 7 is a sectional detail of a portion of the mechanism for reversing the feed mechanism. Figs. 8 and 9 are sectional views, the planes of section being at right angles to each other, of the gearing for transmitting motion to the shaft for driving the feed mechanism. Figs. 10 and 11 are sectional views, the planes of section being at right angles to each other, of the feed-carriage and its operating mechanism. Figs. 12, 13, and 14 are detail views of the drill bars or spindles, Figs. 13 and 14 being transverse sections on the lines *t t* and *v v*, Fig. 12.

In the practice of my invention I provide a rectangular frame consisting of the end pieces 1 and 2 and the side pieces 3, all of said parts being firmly secured together. The side pieces are formed of channel-bars arranged with their flanges 4 projecting inwardly, thereby forming guides and supports for the spindle cross-head or carrier, as hereinafter more fully described.

The cylinders 5 are secured to or formed integral with the frames 6, arranged longitudinally of the main frame and secured thereon by the side brackets or legs 7, extending to the side pieces, and the end brackets 8, preferably formed integral with the head-piece 2 of the frame, the rear ends of the frames 6 being held in proper relation to each other by the cross-brace 9. The piston-rods 10 of said cylinders are connected by crank-pins 11 to disks 12 on opposite ends of the shaft 13, which is mounted in suitable bearings formed in the frames 6.

On the shaft 13 are keyed the gear-wheels 14, intermeshing with corresponding gears 15 on what might be termed the "power-distributing shaft" 16, said shaft being mounted in suitable bearings 17 on the brackets 18, formed on or secured to the rear side of the box, forming the front piece 2 of the main frame, as shown in Figs. 1 and 5.

On the shaft 16 are keyed a series of beveled gear-wheels 19, which intermesh with corresponding beveled gears 20, journaled on short counter-shafts 21, mounted in bearings on the upper ends of the brackets 18, and arms 22, formed on the front side of the box 2, forming the front of the main frame. Pinions 23 are formed integral with the beveled gears 20, and are adapted to intermesh with gear-wheels 24, journaled on short counter-shafts 25, mounted in suitable bearings in the front and rear sides of the box 2. These gear-wheels 24 also have pinions 25[a] formed integral with them, each of the pinions 25[a] being arranged to intermesh with two gear-wheels 26, mounted on the drill bars or spindles 27, which are preferably angular in cross-section and pass through a correspondingly-shaped opening in the gear-wheels 26, as shown in Fig. 4, although the gear-wheels and spindles may be connected together by a key and spline, whereby said spindles are caused to rotate with the gear-wheels. On the outer or front ends of the spindles or bars 27 are secured suitable cutters 28, preferably of the construction described and claimed in Letters Patent No. 387,144, granted to me July 31, 1888.

In order to permit of the cutters being arranged in close proximity to each other, and at the same time to permit of the use of comparatively large gear-wheels for rotating the spindles and cutters without increasing the size of said cutters, the gear-wheels 26 are arranged in different vertical planes, the adjacent gear-wheels overlapping each other, as shown in Figs. 4 and 5. The spindles or bars 27 are supported near their front ends in suitable bearings formed in the front and rear sides of the box 2, and when spindles or bars having an angular cross-section are employed I provide sleeves 29, round in cross-section and having angular openings for the reception of the shafts 27, said sleeves being arranged in the bearings in the front and rear sides of the box 2.

In order to lessen the friction due to the longitudinal movement of the angular spindles or bars 27 through the driving-gears 26 during the cutting operation, the walls of the angular openings through said gear-wheels are formed by friction-rollers 30, arranged in suitable recesses, as shown in Fig. 6. The friction-rollers 30 are held in position by pins 31, inserted through holes through the disk 32, forming the body portion of the gear-wheel 26 prior to shrinking the toothed ring 33, forming the outer portion of such gear-wheel, upon the disk 32.

The spindles or bars 27 are made of a length proportional to the depth of cut desired, and at their rear ends are connected to the cross-head or carriage 34, as shown in Figs. 5 and 10, in such manner as to cause the spindles to move with the cross-head, but permitting of their free rotation. This cross-head or carriage extends across the main frame, and is provided at its ends with wheels 35, resting upon the lower flange of the side pieces 3, and with wheels 36, bearing against the inner walls of the side pieces, said wheels serving to facilitate the movements of the cross-head. To the under side of the flanges of the side pieces 3 are secured racks 37, with which pinions 38 engage, said pinions being keyed to or formed integral with shafts 39, which are mounted in bearings 40 on the cross-head or carriage. On the same shafts with the pinions 38 are secured gear-wheels 41, arranged to intermesh with pinions 42 on shafts 43, which are mounted in bearings 44 and are provided with gear-wheels 45, intermeshing with pinions 46 on the ends of the shaft 47, extending longitudinally of the cross-head or carriage and serving to transmit equal and simultaneous movements to the above-described mechanisms at each end of the cross-head or carriage, as shown in Fig. 1. On the shaft 47, about midway of its length, is keyed a gear-wheel 48, with which a pinion 49, formed integral or moving with the beveled gear-wheel 50, intermeshes, said beveled gear 50 and pinion 49 being mounted on a pin 51, suitably supported by brackets 52 and 53, extending up from the cross-head or carriage, as shown in Fig. 8. The beveled gear 50 intermeshes with a correspondingly-shaped gear-wheel 54, arranged on a shaft 55, mounted in suitable bearings 56, formed on the front and rear end pieces of the main frame, as shown in Figs. 1 and 5. The beveled gear 54 is so connected by a spline and groove with the shaft 55 as to rotate therewith and to move therealong with the cross-head or carriage, with which said beveled gear is connected by a collar 57 on its hub engaging a groove in the bracket 53, formed on or secured to the cross-head or carriage, as shown in Fig. 9.

On the shaft 55, near its rear end, is keyed a gear-wheel 58, intermeshing with a corresponding gear-wheel 59, keyed to the shaft 60, which is mounted at its rear end in suitable bearings 61 on the rear end piece of the main frame and at its forward end in a bearing 62, formed on the lower end of a lever 63, pivotally supported on a bar 64, secured to the engine-frames 6, as shown in Figs. 1, 5, and 7. This arrangement of the shaft permits of such lateral movement thereof by means of the lever 63 as to bring the friction-wheel 65 on the shaft 60 into operative contact with the sides of either one of the disks 66 67 on the engine-shaft 13, thereby rotating the shaft 60 in either direction, as required for the movements of the cross-head or carriage. In order to provide for variations in speed of the cross-head or carriage, the friction-wheel is so connected to the shaft 60 by a spline and groove (see Figs. 1 and 7) as to be capable of movement along said shaft, whereby it may be brought into contact with the sides of the friction-disks at different distances from their centers. This longitudinal adjustment of the friction-wheel 65 is effected by a yoke 68 engaging opposite sides of said wheel, the handle of said yoke extending rearwardly through the lever 63, and being provided with a series of teeth held in engagement with one side of the hole in the lever by a spring 69.

It frequently happens that the coal is so hard that the friction between the wheel 60 and disk 66, which is employed for feeding the cross-head or carriage forward, is not sufficient to force and hold the cutters to their work; hence a beveled gear-wheel 70 is formed on the front end of the friction-wheel 65, said beveled gear being adapted to engage a corresponding gear-wheel 71 on the engine-shaft. By the above-described construction and arrangement of feed-operating mechanism the speed of penetration of the cutters can be regulated according to the character of the coal being cut, the feed being rendered certain when the coal is hard by the engagement of the beveled gears 70 and 71 and sufficiently slow by properly proportioning the relative diameters of said beveled gears.

The front ends of the drill-bars 27 are provided with cutter-holders 72, in which are secured the cutters 28, as hereinbefore stated. Between the holder 72 and the front end of the main frame is arranged a spiral conveyer 73, for removing the dust and dirt from the cut, said conveyer being formed of a flat strip of spring metal wound around the drill bar or spindle, the inner edges of the coils fitting the spindle or bar, but free to move along the same. One end of the strip is secured in a slot cut in a projection or lug 74 on the rear end of the holder 72, as shown in Figs. 12 and 14, and the opposite end of said strip is secured in a slot formed in a ring 75, loosely mounted on a collared sleeve 76, arranged on the spindle or bar 27, but held as against movement with the spindle or bar by a forked keeper 77, engaging one of the collars on said sleeve and bolted to the front end of the main frame, as shown in Figs. 12 and 13.

It will be readily understood from the above that when the spindles or bars 27 are at or near the rearward limit of their movement in the frame the coils of the conveyer will be closed together, as shown in Figs. 1, 2, and 5; but as the cutters move forward in the cutting operation the coils will open, thereby increasing their pitch and rendering the conveyer more effective in removing the dust and dirt from the cut. It will also be understood that by the use of the extensible conveyer the gear-wheel for driving the cutter bar or spindle can be located much nearer the cutter, and at the same time permitting of the use of a conveyer operative along the entire depth of cut, except such portions thereof as are occupied by the cutter.

While operating, the machine is preferably supported by rails 78, secured to beams 79, arranged transversely of the chamber, as shown in Fig. 2, and the machine is held as against rearward and upward as regards its front end movement by undercut hooks 80, secured to the under sides of the side pieces 3 of the main frame and adapted to engage the rail 78 under the front end of the machine, said rail being held from rearward and upward movement by the dogs 81, engaging the floor of the chamber and the rail, and an extensible brace 82, bearing at its ends against the dog 81 and the roof of the chamber, as shown in Figs. 1 and 2.

In lieu of the rails 78 and beam 79, supporting the rear end of the machine, I may employ an adjustable device, as the lifting-jack 83, whereby the rear end of the machine may be raised or lowered for the purpose of effecting a vertical adjustment of the cutters.

In operating my improved machine the spindles or bars are retracted, as shown in Figs. 1 and 2, and the machine is arranged in proper relation to the breast of the chamber, and its forward end secured in position by means of the undercut hooks 80 engaging the rail 79, which is held in proper position by the dog 81 and brace 82. Steam or other suitable fluid is then admitted into the cylinders 5, thereby rotating the cutters through the system of gearing hereinbefore described, connecting the engine-shaft 13 with the drill bars or spindles 27. It will be observed that elements forming parts of this system of gearing from the power-distributing shaft 16 to the drill bars or spindles are so proportioned relatively to each other that there is a gradual and progressive gain of power between the shaft 16 and the drill-bars. In order to move the drill bars or spindles forward, the lever 63 is so shifted as to bring the friction-wheel 65 into firm contact with the disk 66, thereby rotating the shaft 60, gear-wheels 59 and 58, shaft 55, bevel-gears 54 and 50, pinion 49, gear-wheel 48, and shaft 47 on the cross-head or carriage. The rotation of this shaft so operates the systems of gearing at each end of the cross-head or carriage as to move the latter forward, and with it the cutter bars or spindles 27.

It will be observed that elements of the systems of gearing for operating the cross-head or carriage are so proportioned relatively to each other that the initial speed imparted by the disk 66 is considerably reduced in transmission to the pinion 38, engaging the rack 37, and that the power is correspondingly increased. When, by reason of the hardness of the coal being cut, the frictional engagement of the wheel 65 with the disk 66 is not sufficient to feed the cross-head or carriage forward, the wheel 65 is moved along the shaft 60 until the bevel-gear 70 on said wheel engages the corresponding gear 71 on the engine-shaft 13, thereby rendering the feed positive, and also so reducing the speed of such feed as not to force the cutters forward more rapidly than they can cut their way into the coal.

No claim is made herein, broadly, to the combination of a shoe engaging a rail and an extensible prop resting on the shoe and interposed between the latter and a superposed support and operating to clamp and hold the shoe and rail firmly in position.

I claim herein as my invention—

1. In a mining-machine, the combination of a series of revoluble cutter bars or spindles, a movable cross-head or carriage having the bars or spindles connected thereto, a system of gearing at each end of the cross-head or carriage for moving the same, a central system of gearing engaging the systems of gearing at the ends of the carriage, and a frictional gearing for operating the central system of gearing, substantially as set forth.

2. In a mining-machine, the combination of an angular cutter bar or spindle, a gear-wheel having an angular opening therethrough for the reception of the bar or spindle, and rollers interposed between the bar or spindle and the sides of the opening through the gear-wheel, substantially as set forth.

3. In a mining-machine, the combination of a series of cutter bars or spindles and a like series of gear-wheels for revolving such bars or spindles, said gear-wheels being arranged in different vertical planes and overlapping one another, whereby a practically-continuous cut may be formed with comparatively small cutters, substantially as set forth.

4. In a mining-machine, the combination of a revoluble and longitudinally-movable cutter bar or spindle and an extensible conveyer arranged in the rear of the cutter, substantially as set forth.

5. In a mining-machine, the combination of a revoluble and longitudinally-movable cutter bar or spindle and a flat strip of metal wound spirally around said bar or spindle and secured only at its ends to the cutter-bar, substantially as set forth.

6. In a mining-machine, the combination of a series of revoluble cutter bars or spindles, a cross-head or carriage for moving said bars or spindles longitudinally, rotating friction-disks, and a friction-wheel mounted on a horizontally-movable shaft arranged between the friction-disks and adapted through suitable gearing to shift the cross-head or carriage forward and backward, substantially as set forth.

7. In a mining-machine, the combination of a series of revoluble cutter bars or spindles, a cross-head or carriage for moving said bars or spindles longitudinally, rotating friction-disks, and a friction-wheel mounted on a horizontally-movable shaft and longitudinally adjustable therealong, said shaft being arranged between the friction-disks and adapted through suitable gearings to shift the cross-head or carriage forward or backward at different speeds, in accordance with the position of the friction-wheel as regards the axis of the friction-disks, substantially as set forth.

8. The combination of a mining-machine, undercut hooks secured thereto, and a rail for supporting the machine and provided with a head for engagement with the hooks for the purpose of holding the machine as against rearward and upward movement, substantially as set forth.

9. The combination of a mining-machine, undercut hooks secured thereto, a rail engaging said hooks, a supporting-dog constructed to engage the rail and the floor of the chamber, and an extensible brace between said dog and the roof of the chamber, substantially as set forth.

10. The combination of a mining-machine, undercut hooks secured thereto near its front end, an extensible support for the rear end of the machine, and a rail provided with a head for engagement with the hooks, the rail and hooks forming a pivotal support for the front end of the machine, substantially as set forth.

EDWIN E. CARTER.

Witnesses:

DARWIN S. WOLCOTT,
F. E. GAITHER.